United States Patent [19]
Kotake et al.

[11] Patent Number: 5,205,372
[45] Date of Patent: Apr. 27, 1993

[54] HYDRAULIC POWER STEERING DEVICE

[75] Inventors: Yoshimi Kotake, Nara; Tatsuro Motoyama, Kanagawa, both of Japan

[73] Assignees: Koyo Seiko Co., Ltd., Osaka; Mitsubishi Jidosha Kogyo Kabushiki Kaisha, Tokyo, both of Japan

[21] Appl. No.: 730,165

[22] Filed: Jul. 16, 1991

[30] Foreign Application Priority Data

Jul. 17, 1990 [JP] Japan ................ 2-75942[U]
Jul. 17, 1990 [JP] Japan ................ 2-75943[U]

[51] Int. Cl.⁵ ............................. B62D 5/06
[52] U.S. Cl. ................. 180/132; 91/375 A; 91/401; 180/162
[58] Field of Search ............... 180/132, 141, 147, 146, 180/162; 91/375 A, 402, 437, 401

[56] References Cited

U.S. PATENT DOCUMENTS

| | | | |
|---|---|---|---|
| 3,092,083 | 6/1963 | Sheppard | 91/401 X |
| 3,935,790 | 2/1976 | Goff | 91/375 A |
| 4,261,248 | 4/1981 | Elser et al. | 91/401 |
| 4,648,307 | 3/1987 | Rabe | 91/375 A |

FOREIGN PATENT DOCUMENTS 52-45093 11/1977 Japan.
60-122277 8/1985 Japan.

Primary Examiner—David M. Mitchell
Assistant Examiner—Kevin Hurley
Attorney, Agent, or Firm—Mason, Fenwick & Lawrence

[57] ABSTRACT

A device comprising a cylinder and a piston slidably fitted therein and having a metal piston ring attached to its outer periphery. The cylinder has a recess in each of a plurality of portions thereof dividing the inner periphery of the cylinder circumferentially thereof and opposed to the piston ring when the piston is brought close to each of its opposite stroke ends, the recess having a width smaller than the width of fit of the piston to the cylinder. The piston has a recess corresponding to the recess in the cylinder inner periphery and formed in each of a plurality of portions of the piston in the vicinity of the piston ring and diving the outer periphery of the piston circumferentially thereof. The cylinder has two oil chambers formed on the respective opposite sides of the piston and adapted to communicate with each other through the cylinder recess and the piston recess upon the piston being brought close to each stroke end.

3 Claims, 5 Drawing Sheets

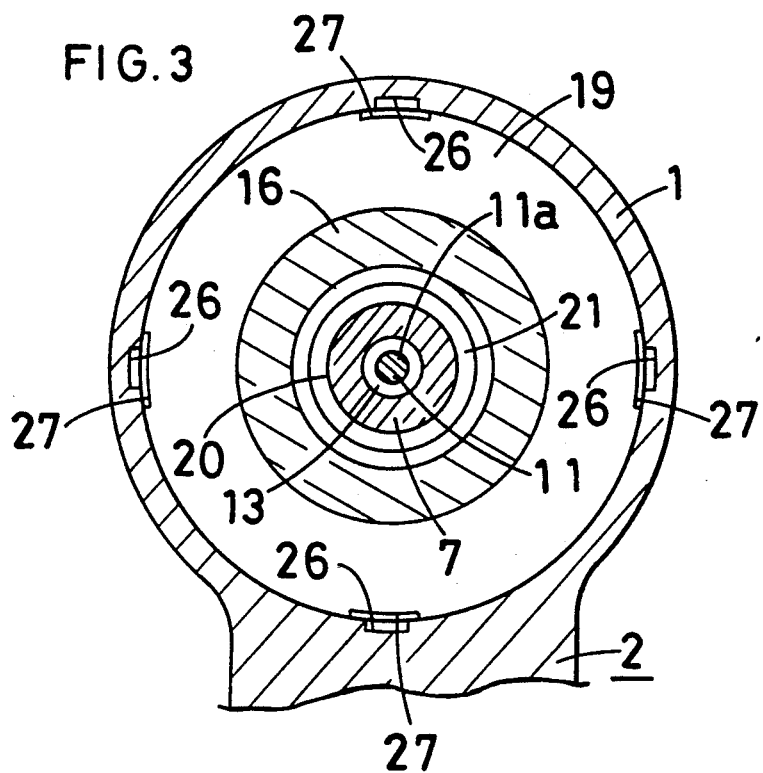
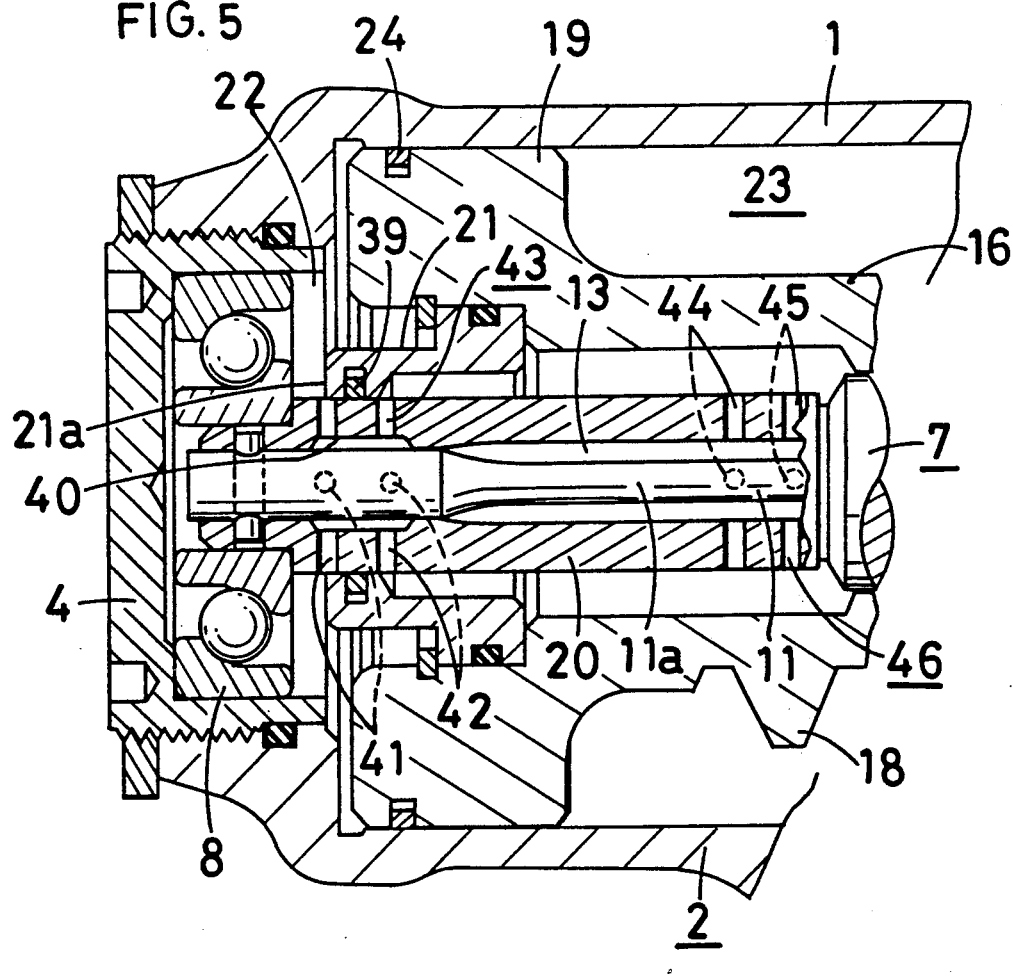

HYDRAULIC POWER STEERING DEVICE

BACKGROUND OF THE INVENTION

The present invention relates to hydraulic power steering devices, for example, for use in motor vehicles.

Motor vehicles, especially trucks and like large vehicles, are equipped with a hydraulic power steering device for assisting the driver in the steering force. Such power steering devices generally comprise a cylinder, and a piston slidably fitted in the cylinder. A hyraulic control valve is provided between an input shaft and an output shaft connected thereto by a torsion bar and operates to move the piston and produce a steering force. In the case of hydraulic power steering devices of the ball screw type, for example, the piston is integral with a ball nut having a rack in mesh with a sector gear on a pitman shaft, which in turn is coupled to the front wheels via a pitman arm, linkages and knuckle arms.

When the steering wheel is turned leftward or rightward to the greatest extent to a limit position in the case of such hydraulic power steering devices, the piston is left subjected to the hydraulic steering force. The hydraulic steering force is great especially in the case of trucks or like large vehicles, so that the possible break in the linkage becomes a problem when the steering wheel is turned to the greatest extent. With hydraulic power steering devices of the ball screw type, the pressure oil supplied from the pump for maximum steering operates the steering device with a pump relief pressure maintained, and the resulting force is likely to apply an excessive load to the knuckle arm stopper via the pitman arm and the linkage. Consequently, the device has the drawback of unexpectedly causing the linkage or knuckle arm to develop trouble. The linkage, knuckle arm and like components must therefore be given higher strength than is needed.

In the case of hydraulic power steering devices of the rack-and-pinion type, the piston is fixed to a rack bar, which is coupled to the wheel via a linkage and a knucle arm. The same problem is encountered also in this case.

Accordingly, a hydraulic power steering device has been proposed which comprises a cylinder and a piston having a piston ring attached to the outer periphery thereof and in which the cylinder is formed in its inner periphery with a recess having a width larger than the width of fit of the piston to the cylinder and opposed to the piston ring when the piston reaches a position in the vicinity of each of its opposite stroke ends. The oil chambers on opposite sides of the piston within the cylinder are adapted to communicate with each other through the recess in the inner periphery of the cylinder upon the piston reaching the position in the vicinity of the stroke end (see Unexamined Japanese Utility Model Publication SHO 60-122277).

With this device, the oil chambers on opposite sides of the piston within the cylinder communicate with each other through the recess upon the piston reaching the position close to the stroke end, thereby permitting the pressure oil to escape from the chamber of high pressure into the other chamber of low pressure to prevent the pressure from rising beyond a certain level and consequently precluding the linkage from breaking.

However, the piston ring of the device is usually made of synthetic resin, is subjected to oil pressure on one of its end faces facing the chamber of high pressure and on its inner periphery and is therefore deformed radially outward when brought into register with the recess in the cylinder inner periphery upon the piston reaching the position close to the stroke end. The piston ring is then in contact with the piston over a greatly diminished area of the grooved wall surface of the piston. In this case, another problem arises in that the piston ring will be damaged or broken, failing to seal off the pressure oil.

Another power steering device is also proposed which comprises a piston or cylinder having a relief valve that functions to release oil of high pressure when the piston is brought close to each of its opposite stroke ends (see Examined Japanese Patent Publication SHO 52-45093).

Nevertheless, the relief valve provided for the piston or cylinder renders the device complex in construction and costly.

SUMMARY OF THE INVENTION

An object of the present invention is to provide a hyraulic power steering device which is adapted to prevent damage and breakage to the linkage or the like. The same may be said regarding the operation of the piston ring.

Another object of the present invention is to provide a hydraulic power steering device which is adapted to prevent the damage or breakage of the linkage and the like and which need not be provided with any additional relief valve for the piston or cylinder and is therefore simple in construction.

The present invention provides a hydraulic power steering device generally comprising a cylinder and a piston slidably fitted therein. A metal piston ring is attached to the outer periphery of the piston. A recess is defined in each of a plurality of portions of the cylinder dividing the inner periphery of the cylinder circumferentially thereof and opposed to the piston ring when the piston reaches a position in the vicinity of each of its opposite stroke ends. The recess has a width smaller than the width of fit of the piston to the cylinder. A recess corresponding to the recess in the cylinder inner periphery is defined on the piston. The piston recess is formed in each of a plurality of portions of the piston in the vicinity of the piston ring and divides the outer periphery of the piston circumferentially thereof. Two oil chambers are formed within the cylinder on the respective opposite sides of the piston and are adapted to communicate with each other through the recess in the cylinder inner periphery and the recess in the piston outer periphery upon the piston reaching the position in the vicinity of each stroke end.

When the piston reaches the position close to each of its opposite stroke ends, the oil chambers on opposite sides communicate with each other through the recess in the cylinder inner periphery and the recess in the piston outer periphery to thereby release the pressure oil from the chamber of high pressure into the other chamber of low pressure. This prevents the pressure from rising beyond a certain level, precluding the linkage from damage or breakage.

The piston ring because it is made of metal has less of a chance of being deformed by the hyraulic pressure and remains in contact with the grooved portion of the piston in a state free of changes. Since the cylinder inner peripheral recess is formed in each of the plurality of portions arranged circumferentially of the cylinder, the inner peripheral surface of the cylinder other than these recesses contacts the piston ring to prevent the deformation and damage of the piston ring. Further because the piston outer peripheral recess is formed in each of the plurality of portions of the piston arranged circumferentially thereof, the outer peripheral surface of the piston other than these recesses contacts the cylinder inner peripheral surface. This gives the piston an increased area of contact with the cylinder to reduce the surface pressure.

The oil chambers on opposite sides are allowed to communicate with each other through the recess in the cylinder inner periphery and the recess in the piston outer periphery, so that the piston or the cylinder need not be provided with any additional relief valve but needs only to be formed with the recess. This assures ease of working, rendering the device simple in construction and less costly.

The present invention further provides a hydraulic power steering device having inside a cylinder an output shaft including a ball screw portion, a ball nut fitted around the ball screw portion with a multiplicity of balls interposed therebetween movably in circulation, and a piston movable with the ball nut within the cylinder and dividing the interior of the cylinder into two oil chambers on opposite sides of the piston, the device being characterized in that the output shaft is formed with a communication oil channel for permitting the two oil chambers to communicate with each other therethrough upon the piston reaching a position in the vicinity of each of its opposite stroke ends.

When the piston reaches the position close to each stoke end thereof, the oil chambers on opposite sides are allowed to communicate with each other through the oil channel formed in the output shaft, whereby the pressure oil is released from the chamber of high pressure to the other chamber of low pressure. This prevents the pressure from rising beyond a certain level to preclude the linkage from damage or breakage.

The structure wherein the two oil chambers are adapted to communicate with each other through the oil channel in the output shaft eliminates the need to provide an additional relief valve for the piston or the cylinder. Since the communication oil channel needs only to be formed through the output shaft, the device can be provided by facilitated working and is simple in construction and less costly.

BRIEF DESCRIPTION OF THE DRAWINGS

FIG. 3 is a view in section taken along the line Y—Y in FIG. 1;

FIG. 5 is an enlarged view in longitudinal section of the device of FIG. 4 chiefly showing a piston as positioned in the vicinity of its front stroke end.

DESCRIPTION OF THE PREFERRED EMBODIMENTS

Figure 1:
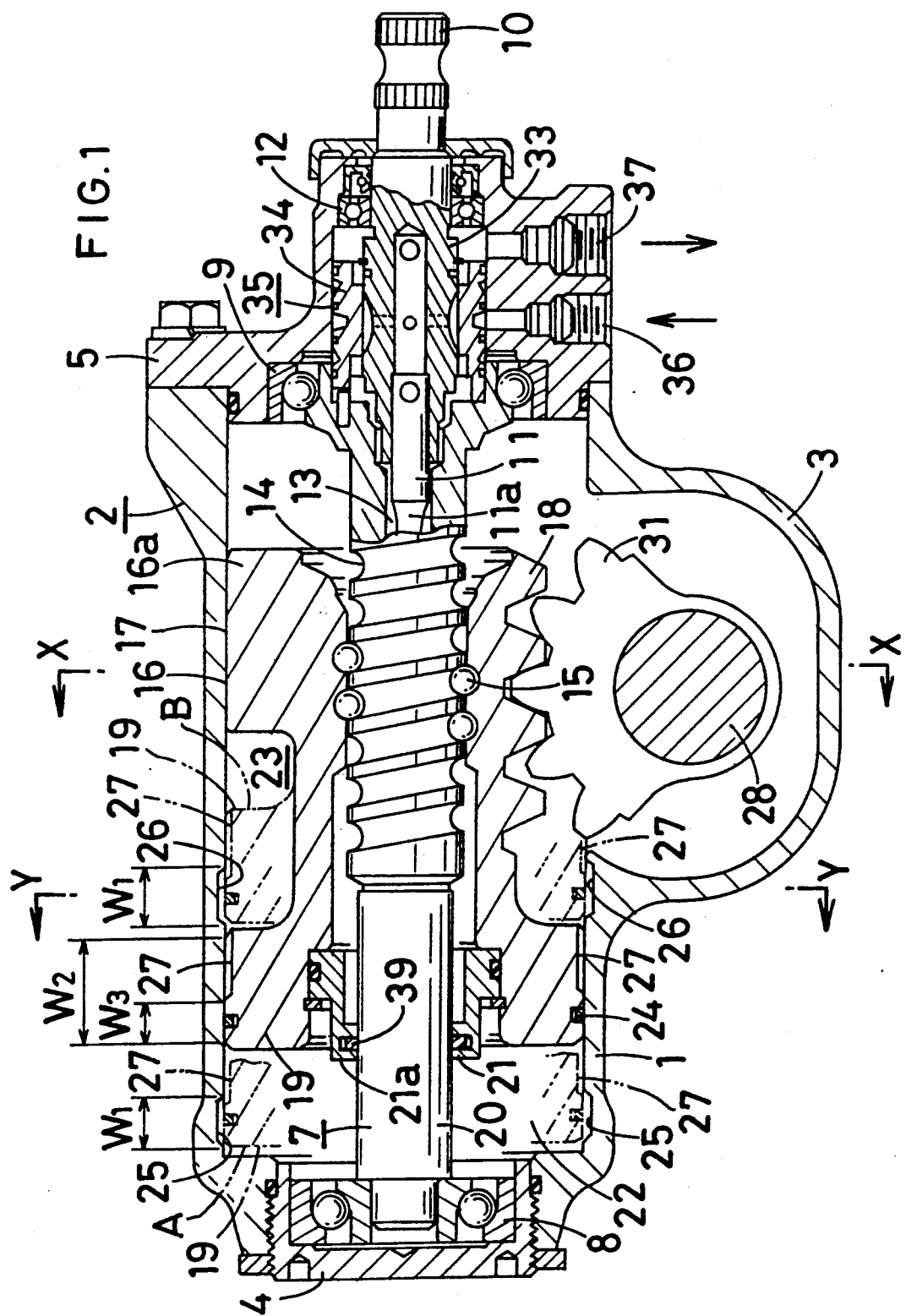
FIG. 1 is a view in longitudinal section of a hydraulic power steering device of the ball screw type embodying the invention.

With reference to the drawings, two embodiments of the invention will be described below which are hydraulic power steering devices of the ball screw type. Throughout the drawings, like parts are designated by like reference numerals.

Figure 2:
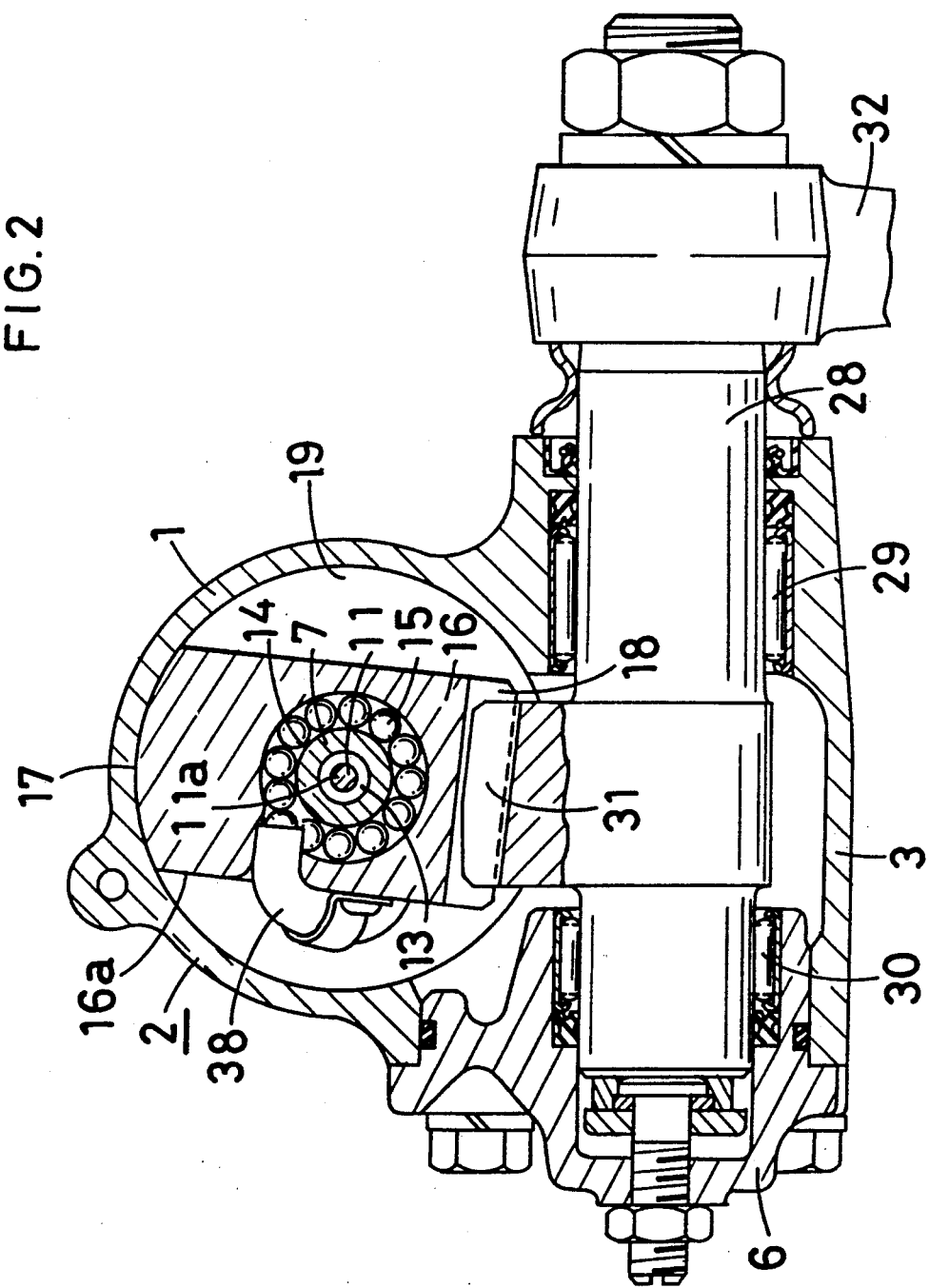
FIG. 2 is a view in section taken along the line X—X in FIG. 1.

FIGS. 1 to 3 show the first of these embodiments. In the description of the first embodiment, the left-hand side of FIG. 1 will be referred to as "front," the right-hand side thereof as "rear," and the upper and lower sides of the same drawing as "upper" and "lower," respectively. The terms "right" and "left" are used as the device is viewed as illustrated in FIG. 2.

The power steering device comprises a housing 2 having a cylinder 1 extending from the front rearward. A pitman shaft support tubular portion 3 extending transversely of the cylinder 1 of the housing 2 is integral with the rearward lower portion of the cylinder 1. An opening at the front end of the cylinder 1 is closed with a front closure 4, an opening at the rear end thereof with a rear closure 5, and an opening at the left end of the tubular portion 3 including the left lower portion of the cylinder 1 with a side closure 6.

An output shaft 7 extending from the front rearward is disposed inside the cylinder 1 concentrically therewith and rotatably supported by a bearing 8 mounted on the front closure 4 and a bearing 9 mounted on the front portion of the rear closure 5. The output shaft 7 has an open hollow rear portion. An output shaft 10 extending longitudinally of the cylinder 1 is in alignment with the output shaft 1 and disposed concentrically with the interior of the rear closure 5 so as to be opposed to the hollow cavity of the output shaft 7. The input shaft 10 has an open hollow front portion. The output shaft 7 and the input shaft 10 are connected together in alignment by a torsion bar 11 inserted in the hollow cavities of these shafts. The input shaft 10 is rotatably supported at its rear portion by a bearing 12 mounted on the rear portion of the rear closure 5. The rear end of the input shaft 10 extends rearward through the rear closure 5, and is connected to a steering wheel although not shown. The torsion bar 11 has front and rear ends which are intimately fitted in the front end of the hollow cavity of the output shaft 7 and the front end of the hollow cavity of the input shaft 10, respectively. The torsion bar 11 has an intermediate portion which serves as a twisting portion 11a having a smaller outside diameter than its opposite ends. An annular space 13 is formed in the hollow cavity of the output shaft 7 around the twisting portion 11a.

The output shaft 7 has a ball screw portion 14 at an intermediate part thereof. A ball nut 16 is fitted around the ball screw portion 14 with a multiplicity of balls 15 interposed therebetween movably in circulation. The ball nut 16 is integral with an upward projection 16a which is formed at its top portion with a segmental cylindrical surface 17 slidable in contact with the upper portion of inner periphery of the cylinder 1. The ball nut 16 is spaced apart from the inner peripheral surface of the cylinder 1 except at the segmental cylindrical surface 17. A ball tube 38 for circulating the balls 15 is attached to the left side of the ball nut 16. The ball nut 16 is formed at its bottom with a rack 18. The ball nut 16 extends forward beyond the ball screw portion 14 of the output shaft 7 and has a front end portion integral with a piston 19. The piston 19 has an inner peripheral surface defining a hole and having attached thereto a seal member 21 for sealing off the clearance in the piston 19 around a front solid cylinder portion 20 of the output shaft 7 extending forward from its ball screw portion 14. The piston 19 and the seal member 21 divide the interior of the cylinder 1 into a front oil chamber 22 and a rear oil chamber 23. A metal piston ring 24 is attached to the outer periphery of the front portion of the piston 19. The seal member 21 has at its front end an inward flange 21a having a predetermined width, fitting around the cylinder portion 20 of the output shaft 7 and slidable thereon. A metal seal ring 39 is attached to the inner periphery of the flange 21a. The space inside the ball nut 16 around the output shaft 7 rearward from the seal member 21 is in communication with the rear oil chamber 23.

The front stroke end of the piston 19 is determined by the contact of the front end of the piston 19 with the front closure 4, and the rear stroke end thereof by the contact of the rear end of the ball nut 16 with the rear closure 5.

The front and rear two portions of the inner peripheral surface of the cylinder 1 to be opposed to the piston ring 24 when the piston 19 is brought close to its front and rear stroke ends are formed with a plurality of, e.g. four, recesses 25 and 26, respectively, which are arranged at a spacing circumferentially of the cylinder 1. Preferably, the front and rear recesses 25, 26 are so positioned as to circumferentially divide the inner periphery of the cylinder 1 into equal portions. Recesses 27 corresponding to the recesses 25, 26 in the cylinder 1 are formed in a plurality of, e.g. four, portions of the outer peripheral surface of the piston 19 at the right side of the piston ring 24. These recesses 27 extend each in the form of a groove longitudinally of the cylinder 1 from a position close to the rear side of the piston ring 24 to the rear end of the piston 19. The longitudinal width W1 of the cylinder recesses 25, 26 is smaller than the width W2 of fit of the piston 19 to the cylinder 1 but is larger than the longitudinal width W3 of the piston 10 other than the recesses 27 therein. The front and rear oil chambers 22, 23 communicate with each other through the front recesses 25 in the cylinder 1 and the recesses 27 in the piston 19 upon the piston 19 reaching a postion close to its front stroke end. The front and rear oil chambers 22, 23 communicate with each other through the rear recesses 26 in the cylinder 1 and the recesses 27 in the piston 18 upon the piston 19 reaching a position close to its rear stroke end.

A pitman shaft 28 extending transversely of the cylinder 1 is disposed within the tubular portion 3 of the housing 2 and rotatably supported by a bearing 29 mounted on the tubular portion 3 and a bearing 30 mounted on the side closure 6. The pitman shaft 28 is fixedly provided at an intermediate portion thereof with a sector gear 31, which is in mesh with the rack 18 on the ball nut 16. The pitman shaft 28 extends to the right from the tubular portion 3 and fixedly carries a pitman arm 32 at the projected end. Although not shown, the pitman arm 32 is connected in a conventional manner to the front wheels through linkages and knuckle arms.

A portion of the input shaft 10 positioned inside the rear closure 5 provides an inner valve 33. An outer valve 34 positioned between the inner valve 33 and the rear closure 5 is fixed to the rear end of the output shaft 7. These valves constitute a known rotary hydraulic control valve 35. An oil inlet port 36 and an oil outlet port 37 are formed in the rear closure 5. These ports 36, 37 are in communication with an oil pressure source (not shown) and with two oil chambers 22, 23 of the cylinder 1 via the control valve 35.

With the power steering device described, the rotaton of the steering wheel is transmitted to the output shaft 7 through the input shaft 10 and the torsion bar 11 to rotate the output shaft 7, which in turn moves the ball nut 16 and the piston 19 in the longitudinal direction. The ball nut 16, when thus moved, rotates the pitman shaft 28 and the pitman arm 32 through the meshing engagement of the rack 18 with the sector gear 31, consequently steering the front wheels by way of the linkages, etc. Further the rotation of the steering wheel twists the twisting portion 11a of the torsion bar 11 to produce a difference in rotation between the input shaft 10 and the output shaft 7, i.e., between the inner valve 33 and the outer valve 34. Accordingly, pressure oil is supplied to one of the oil chambers 22, 23 of the cylinder 1 via the inlet port 36 and the hydraulic control valve 35 to urge the piston 19 in the direction of movement of the ball nut 16 by the rotation of the output shaft 7 and produce a hydraulic steering force.

When the steering wheel is rotated leftward, the ball nut 16 and the piston 19 move forward to steer the front wheels leftward. At this time, the inner valve 33 rotates leftward relative to the outer valve 34 to supply the pressure oil through the inlet port 36 and through the hydraulic control valve 35 to the rear oil chamber 23 of the cylinder 1, urging the piston 19 forward. When the piston 19 reaches the position in the vicinity of the front stroke end as indicated in broken lines A in FIG. 1, the piston ring 24 is brought into register with the front recesses 25 in the cylinder 1, allowing the pressure oil supplied to the rear chamber 23 to escape into the front chamber 22 through the recesses 27 in the piston 19 and the front recesses 25 in the cylinder 1. Consequently, the internal pressure of the rear chamber 23 lowers to reduce the torque on the pitman shaft 28 and also reduce the force to be transmitted by way of the linkages.

When the steering wheel is rotated rightward, the ball nut 16 and the piston 19 move rearward to steer the front wheels rightward. At this time, the inner valve 33 rotates rightward relative to the outer valve 34 to supply the pressure oil through the inlet port 36 and through the hydraulic control valve 35 to the front oil chamber 22 of the cylinder 1, urging the piston 19 rearward. When the piston 19 reaches the position in the vicinity of the rear stroke end as indicated in broken lines B in FIG. 1, the piston ring 24 is brought into register with the rear recesses 26 in the cylinder 1, allowing the pressure oil supplied to the front chamber 22 to escape into the rear chamber 23 through the rear recesses 26 in the cylinder 1 and the recesses 27 in the piston 19. Consequently, the internal pressure of the front chamber 22 lowers to reduce the torque on the pitman shaft 28 and also reduce the force to be transmitted via the linkages.

The structure wherein a plurality of recesses are formed in the cylinder inner periphery, as well as in the piston outer periphery, to divide the periphery as in the embodiment described is applicable not only to the hydraulic power steering device of the ball screw type but also to those of other types such as the rack-pinion type.

Figure 4:
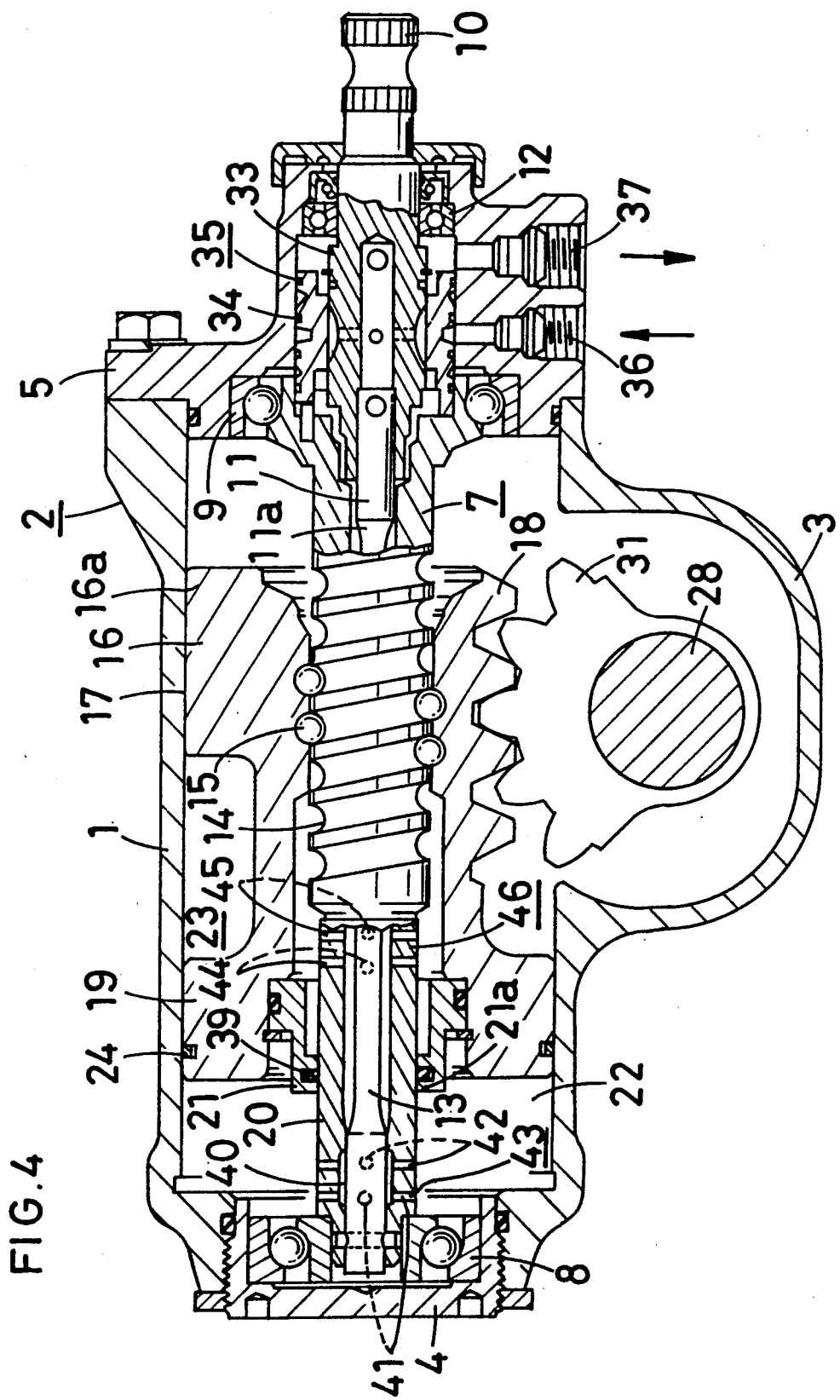
FIG. 4 is a view in longitudinal section of another hydraulic power steering device of the ball screw type embodying the invention.
Figure 6:
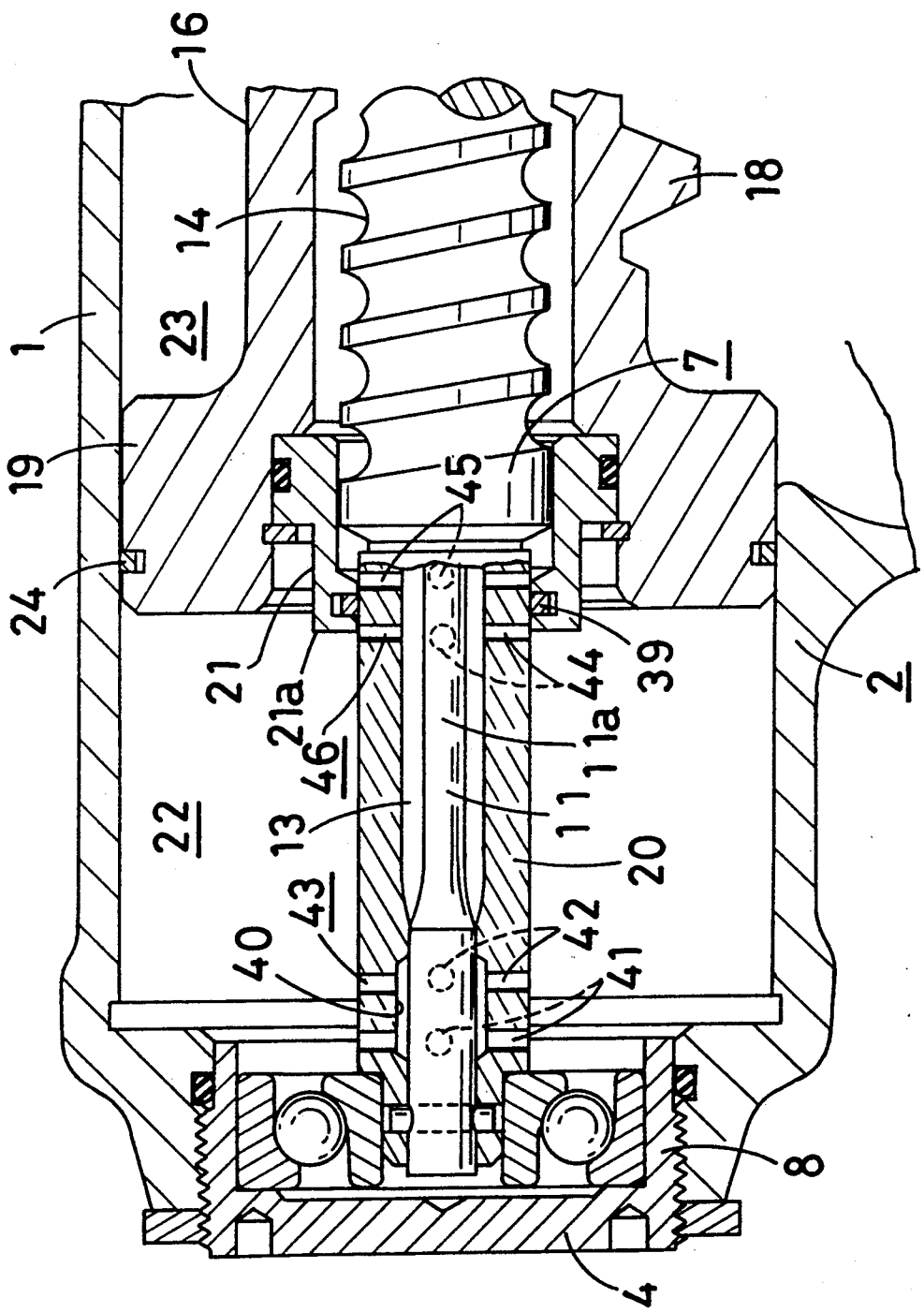
FIG. 6 is an enlarged view in longitudinal section of the device of FIG. 4 chiefly showing the piston as positioned in the vicinity of its rear stroke end.

FIGS. 4 to 6 show the second embodiment. In the description of the second embodiment, the left-hand side of FIG. 4 will be referred to as the "front," the right-hand side thereof as the "rear," the upper and lower sides thereof as "upper" and "lower," the front side of the plane of the same drawing as the "left" and the rear side of the plane as the "right."

In the case of the second embodiment, the cylinder 1 and the piston 19 are not formed with the recesses 25 and 26, or 27 unlike the first embodiment.

The front end of the torsion bar 11 is intimately fitted in a bore in the front end of the output shaft cylinder portion 20, and a shallow annular groove 40 is formed in the inner periphery defining the bore. The cylinder portion 20 is formed at its front part with, for example, four radial oil ports 41 extending from the front portion of the annular groove 40 to the outer periphery of the cylinder portion 20 and arranged at equal spacings circumferentially of the output shaft 7. The cylinder portion 20 similarly has, for example, four oil ports 42 extending from the rear portion of the annular groove 40 to the outer periphery of the cylinder portion 20. At the outer peripheral surface of the output shaft cylinder portion 20, the portion including the front and rear poil ports 41, 42 has a longitudinal width which is slightly larger than the width of fit of the seal ring 39 of the seal member 21 to the cylinder portion 20. The front and rear oil ports 41, 42 and the annular groove 40 therebetween provide a first communication oil channel 43. Upon the piston 19 reaching a position in the vicinity of its front stroke end, the front and rear oil chambers 22, 23 communicate with each other through the first communication oil channel 43 at the portion of seal ring 39 of the seal member 21. The output shaft cylinder portion 20 is formed at its rear part with, for example, four radial oil ports 44 extending from its inner periphery defining the annular space 13 to the outer periphery thereof and arranged at equal spacings circumferentially of the output shaft 7. At a short distance rearward from these ports 44, the cylinder portion 20 similarly has, for example, four oil ports 45 extending from the annular space 13 to the outer periphery thereof. At the outer peripheral surface of the output shaft cylinder portion 20, the portion including the front and rear oil ports 44, 45 has a longitudinal width which is slightly larger than the width of fit of the seal ring 39 of the seal member 21 to the cylinder portion 20. The front and rear oil ports 44, 45 and the annular space 13 therebetween provide a second communication oil channel 46. Upon the piston 19 reaching a position in the vicinity of its rear stroke end, the front and rear oil chambers 22, 23 communicate with each other through the second communication oil channel 46 at the portion of seal ring 39 of the seal member 21.

The second embodiment has the same construction as the first with the exception of the above feature.

When the piston 19 is brought close to the front stroke end as seen in FIG. 5, the seal ring 39 of the seal member 21 is positioned between the front and rear oil ports 41, 42 of the first communication oil channel 43, permitting the front and rear oil chambers 22, 23 to communicate with each other through the channel 43. Consequently, the pressure oil supplied to the rear chamber 23 escapes through the channel 43 into the front chamber 22 to lower the internal pressure of the rear chamber 23, reducing the torque acting on the pitman shaft 28 and also reducing the force to be transmitted through the linkages.

When the piston 19 is brought close to the rear stroke end is shown in FIG. 6, the seal ring 39 of the seal member 21 is positioned between the front and rear oil ports 44, 45 of the second communication oil channel 46, permitting the front and rear oil chambers 22, 23 to communicate with each other through the channel 46. Consequently, the pressure oil supplied to the front chamber 22 escapes through the channel 46 into the rear chamber 23 to lower the internal pressure of the front chamber 22, reducing the torque acting on the pitman shaft 28 and also reducing the force to be transmitted through the linkages.

What is claimed is:

1. A hydraulic power steering device comprising:
   a cylinder;
   a piston slidably fitted within said cylinder, said piston having a metal piston ring attached to the outer periphery thereof;
   a recess in each of a plurality of portions of said cylinder for dividing the inner periphery of the cylinder circumferentially thereof and opposed to the piston ring when the piston reaches a first position in the vicinity of each of its opposite stroke ends, said recess having a width smaller than the width of fit of the piston to the cylinder;
   a recess in said piston corresponding to the recess in the cylinder inner periphery, said piston recess being formed in each of a plurality of portions of the piston in the vicinity of the piston ring and dividing the outer periphery of the piston circumferentially thereof;
   two oil chambers formed within said cylinder on respective opposite sides of the piston and adapted to communicate with each other through the recess in the cylinder inner periphery and the recess in the piston outer periphery upon the piston reaching the position in the vicinity of each stroke end; and
   an output shaft within said cylinder, said output shaft including a ball screw portion and a ball nut fitted around said ball screw portion with a multiplicity of balls interposed therebetween movably in circulation, said piston being movable with the ball nut within said cylinder.

2. A hydraulic power steering device comprising:
   a cylinder;
   an output shaft including a ball screw portion positioned in the cylinder;
   a ball nut fitted around the ball screw portion with a multiplicity of balls interposed therebetween movably in circulation;
   a piston movable with the ball nut within the cylinder and dividing the interior of the cylinder into two oil chambers on opposite sides of the piston; and
   said output shaft being formed with a communication oil channel for permitting the two oil chambers to communicate with each other therethrough upon the piston reaching a position in the vicinity of each of its opposite stroke ends.

3. The hydraulic power steering device as defined in claim 2, wherein said piston includes a seal member slidable in contact with the outer peripheral surface of a cylinder portion of the output shaft for the piston, said seal member dividing the interior of the cylinder into the two oil chambers on opposite sides, a torsion bar being disposed in a hollow portion of the output shaft for connecting the output shaft to an input shaft, the communication oil channel being provided by an annular space formed inside the cylinder portion of the output shaft around the torsion bar therein and by front and rear radial ports extending respectively from the front and rear portions of the annular space to the outer peripheral surface of the cylinder portion, the front and rear ends of the communication oil channel at the outer peripheral surface of the cylinder portion facing the respective oil chambers in front and rear of the seal member upon the piston reaching the position in the vicinity of the stroke end.

* * * * *